(12) United States Patent
diGirolamo et al.

(10) Patent No.: US 7,225,590 B1
(45) Date of Patent: Jun. 5, 2007

(54) BRICK TIE

(75) Inventors: Edward R. diGirolamo, Raleigh, NC (US); Michael L. Torres, Raleigh, NC (US); John G. Eberdt, Raleigh, NC (US)

(73) Assignee: The Steel Network, Inc., Raleigh, NC (US)

( * ) Notice: Subject to any disclaimer, the term of this patent is extended or adjusted under 35 U.S.C. 154(b) by 260 days.

(21) Appl. No.: 10/618,892

(22) Filed: Jul. 14, 2003

(51) Int. Cl.
*E04B 1/38* (2006.01)

(52) U.S. Cl. .............................. 52/379; 52/513; 52/713

(58) Field of Classification Search .................. 52/513, 52/378, 379, 713, 714, 565, 704, 710, 512; 248/221.11, 221.13; 411/466
See application file for complete search history.

(56) References Cited

U.S. PATENT DOCUMENTS

| | | | | | |
|---|---|---|---|---|---|
| 441,227 | A | * | 11/1890 | Cary ............................. | 217/70 |
| 961,584 | A | * | 6/1910 | Decker ......................... | 52/714 |
| 1,725,200 | A | * | 8/1929 | Lampert ....................... | 52/379 |
| 1,810,597 | A | * | 6/1931 | Stanley ....................... | 52/489.2 |
| 1,854,633 | A | * | 4/1932 | Stephens ..................... | 52/215 |
| 1,934,760 | A | * | 11/1933 | Awbrey ........................ | 52/710 |
| 1,936,223 | A | * | 11/1933 | Awbrey ........................ | 52/562 |
| 2,282,631 | A | * | 5/1942 | Winship ..................... | 411/516 |
| 2,339,841 | A | * | 1/1944 | Deuchler et al. .......... | 52/489.2 |
| 2,937,418 | A | * | 5/1960 | Sanford ....................... | 403/231 |
| 3,189,137 | A | * | 6/1965 | Harris .......................... | 52/765 |
| 3,304,106 | A | * | 2/1967 | McCormack ............... | 403/306 |
| 3,601,428 | A | * | 8/1971 | Gilb .......................... | 403/232.1 |
| 3,918,230 | A | * | 11/1975 | Carroll ...................... | 52/309.17 |
| 4,021,990 | A | * | 5/1977 | Schwalberg .................. | 52/479 |
| 4,206,577 | A | * | 6/1980 | Moriez et al. ............. | 52/405.2 |
| 4,245,448 | A | * | 1/1981 | Agar .......................... | 52/489.2 |
| 4,359,849 | A | * | 11/1982 | Goeman ...................... | 52/479 |
| 4,373,314 | A | * | 2/1983 | Allan .......................... | 52/434 |
| 4,382,416 | A | * | 5/1983 | Kellogg-Smith ............. | 114/90 |
| 4,598,518 | A | * | 7/1986 | Hohmann ..................... | 52/410 |
| 4,765,108 | A | * | 8/1988 | Lapish ........................ | 52/379 |
| 4,843,776 | A |   | 7/1989 | Guignard | |
| 4,875,319 | A | * | 10/1989 | Hohmann ..................... | 52/383 |
| 4,955,172 | A | * | 9/1990 | Pierson ........................ | 52/710 |

(Continued)

*Primary Examiner*—Robert Canfield
(74) *Attorney, Agent, or Firm*—Coats & Bennett, P.L.L.C.

(57) ABSTRACT

A brick tie for interconnecting a brick wall with a back-up wall comprised of a plurality of spaced apart studs and a wall board secured to the studs wherein each stud includes a pair of opposed side flanges and a web formed between the flanges. The brick tie includes a plate having a series of spikes projecting from a backside. The spikes are adapted to be pushed into and through a portion of the wallboard so as to at least partially support the plate on the wallboard. Further, the plate is positioned on the wallboard such that it aligns with one side flange of a stud. Further, the brick tie includes a series of fasteners that are extended through the plate, through the wallboard and into the side flange of the stud. A loop or tie holder is secured or formed on the front of the plate. A tie is at least partially confined in the loop and the loop is of such a size that the tie can be vertically adjusted within the loop when the plate is secured to the wallboard. When the brick tie is secured to the back-up wall, the tie projects outwardly from the plate and extends between two layers of brick or block so as to anchor or secure the brick or block wall to the back-up wall.

1 Claim, 5 Drawing Sheets

U.S. PATENT DOCUMENTS

| | | | |
|---|---|---|---|
| 5,435,111 A * | 7/1995 | Cox et al. | 52/713 |
| 5,456,052 A * | 10/1995 | Anderson et al. | 52/713 |
| 5,548,939 A * | 8/1996 | Carmical | 52/707 |
| 5,636,486 A | 6/1997 | Hall | |
| 5,816,008 A * | 10/1998 | Hohmann | 52/565 |
| 6,105,332 A * | 8/2000 | Boyadjian | 52/698 |
| 6,209,281 B1 * | 4/2001 | Rice | 52/714 |
| 6,212,841 B1 | 4/2001 | Plume | |
| 6,293,061 B1 * | 9/2001 | Horak, Jr. | 52/213 |
| 6,367,216 B1 * | 4/2002 | Maylon | 52/454 |
| 6,601,361 B2 * | 8/2003 | Seibert | 52/698 |
| 6,725,619 B1 * | 4/2004 | Barber | 52/712 |
| 6,895,718 B2 * | 5/2005 | Moffatt | 52/204.55 |

* cited by examiner the present invention relates to brick ties of the type
BRICK TIE

FIELD OF THE INVENTION

The present invention relates to brick ties of the type which are used for anchoring a brick wall to a back-up wall including a series of spaced apart studs.

BACKGROUND OF THE INVENTION

It is common practice to provide a building, for example, a light steel framed industrial building, with a brick exterior wall. Since such a brick wall may have considerable length and height, it is necessary to anchor the wall at intervals to an adjoining structure of the building. Such buildings usually also include a back-up wall which typically would include a series of spaced apart studs and some form of a wall board disposed between the studs and the brick wall. For example, it is common to use an exterior gipboard sheathing along with a separate vapor barrier sheet material about the outside of the studs and in the area between the studs and the brick wall.

In the construction of such buildings, the brick wall is built by bricklayers while other tradesmen construct other parts of the building before the brick wall is built. In many cases, to anchor the exterior brick wall, brick ties are secured to the back-up wall by a framing crew or contractor before the brick wall is constructed. Specifically, the brick ties are usually secured to individual studs of the back-up wall and are projected from the studs through the wallboard. Thereafter when the exterior brick wall is constructed, the bricklayers will cause the brick ties to be embedded in mortar between two courses of brick or block.

Brick ties are well known in the art. For example, see the brick ties disclosed in the following U.S. Pat. Nos.: 4,843,776; 6,212,841; 5,636,486; 4,021,990; and 6,209,281. The disclosures of these patents are expressly incorporated herein by reference. In such prior art, the brick ties are connected to the back-up wall structure in a variety of ways. Some of the brick ties are actually secured to the metal studs and then are projected through the adjacent wallboard such that the tie component lies exterior of the wallboard for use by a brick mason. Therefore, one of the main drawbacks to brick ties of the prior art is that they have been difficult to implement in a wall structure, and as noted above, sometimes requiring two different tradesmen in order to mount and complete the tying or anchoring arrangement.

Therefore, there has been and continues to be a need for a relatively simple brick tie that is easy to install and which can be installed and completely implemented by a brick mason.

SUMMARY OF THE INVENTION

The present invention entails a brick tie that is adapted to be interconnected between a brick wall and a back-up wall having a series of spaced apart studs and a wallboard secured to the studs wherein each stud includes a pair of spaced apart flanges and a web extending between the flanges. The brick tie comprises a plate adapted to fit flush against the wallboard with the plate including a backside and a front side. A series of spikes project outwardly from the backside of the plate for projecting into the wallboard and at least partially securing the plate to the wallboard. Fastener openings are provided in the plate and a series of fasteners project through the fastener openings and into the wallboard and into a flange of a stud for securing the plate to the stud. A tie holder or opening is formed on the front side of the plate and a tie is secured to the tie holder and freely movable up and down therein. The tie secured by the tie holder is adapted to project outwardly from the plate such that a brick mason may insert the tie between two courses of brick in the brick wall so as to anchor the brick wall to the back-up wall.

Another aspect of the present invention entails providing a brick tie that can be easily secured to the back-up wall. This aspect of the present invention entails providing the brick tie with a plate and a series of spikes that project from a backside of the plate. When implemented, the spikes are utilized to project directly into the wallboard forming a part of the back-up wall.

In this same regard, the present invention entails a method of securing a brick tie between a brick wall and a back-up wall. This method comprises securing a plate of the brick tie to the wallboard by providing the series of spikes wherein the spikes project from the backside of the plate and project into the wallboard so as to support the brick tie on the wallboard by the position of the spikes penetrating the wallboard. In this method, the plate of the brick tie is secured to the wallboard in alignment with a stud. More particularly, the plate is secured to the wallboard such that the one or more fasteners can be extended through the plate, through the wallboard and directly into a side flange of an aligned stud.

Other objects and advantages of the present invention will become apparent and obvious from a study of the following description and the accompanying drawings which are merely illustrative of such invention.

DESCRIPTION OF EXEMPLARY EMBODIMENTS

Figure 1:
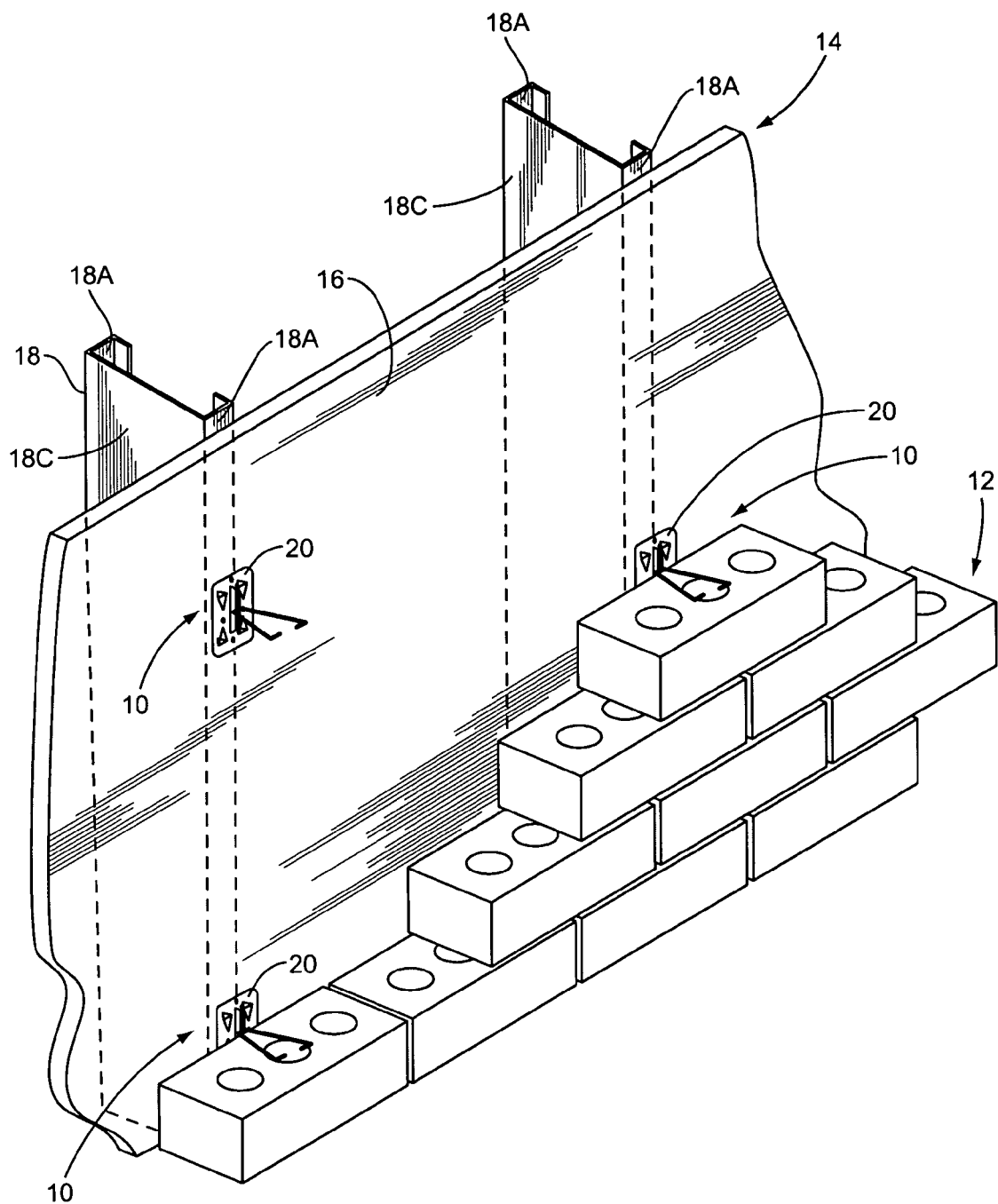
FIG. 1 is a perspective view of a wall section showing the brick tie of the present invention being mounted directly to the wallboard and a particular stud.

With further reference to the drawings, the brick tie of the present invention is shown therein and indicated generally by the numeral 10. As seen in FIG. 1, a series of brick ties 10 is incorporated into a wall structure that includes a brick wall indicated generally by the numeral 14 and a back-up wall indicated generally by the numeral 14. The back-up wall 14 is of a conventional construction and includes a wallboard 16 and a series of spaced apart studs 18 secured, as viewed in FIG. 1, behind the wallboard 16. Wallboard 16 can be of any conventional board structure that is utilized between the studs and a brick veneer wall. For example, the wallboard may be a structure known as gipboard. In any event, the wallboard is secured directly to the studs 18. The studs 18 are also of a conventional design utilized in metal walls. As illustrated in FIG. 1, each stud includes a pair of opposed flanges 18A and a web 18B extending between the opposed flanges.

Turning to the brick tie 10, it is seen that it basically comprises a plate 20. Plate 20 includes a front side and a backside. A series of openings 22 are formed in the plate 20. A series of spikes 24 project outwardly from the backside of the plate 20 generally normal to the plate. In this particular embodiment, the openings 22 and the spikes 24 are generally triangularly shaped. That is, in forming the spikes 24, the plate 20 is partially cut along two sides of the triangular openings 22. The portion of the plate between the cuts is then bent out of the plane of the plate 20 to form the spikes 24. It should be appreciated that the spikes 24 may be assume various shapes or secured to the plate in other ways.

Figure 6:
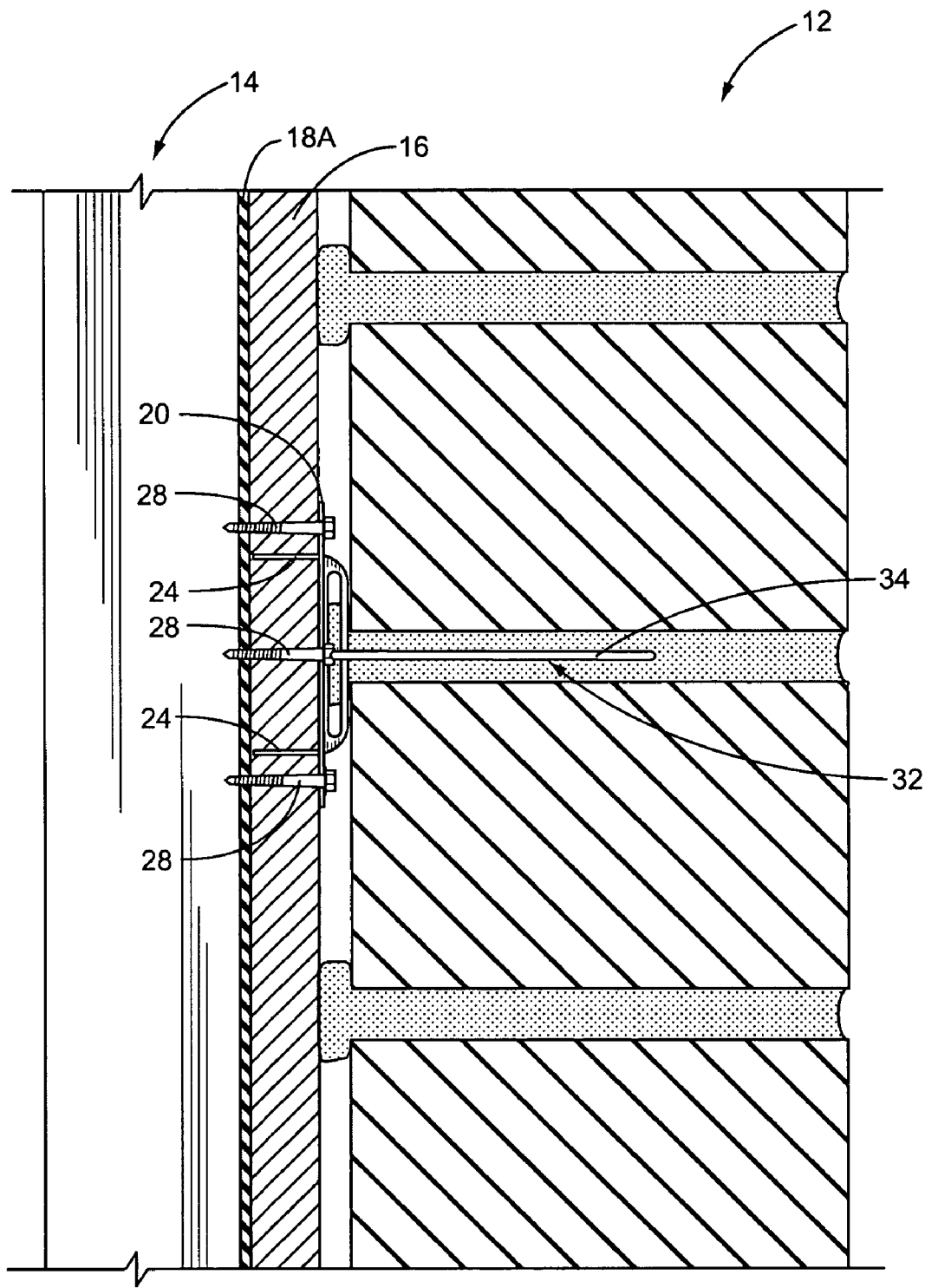
FIG. 6 is a cross sectional view of a brick wall and back-up wall section showing the brick tie interconnecting the back-up wall with the brick wall.
Figure 9:
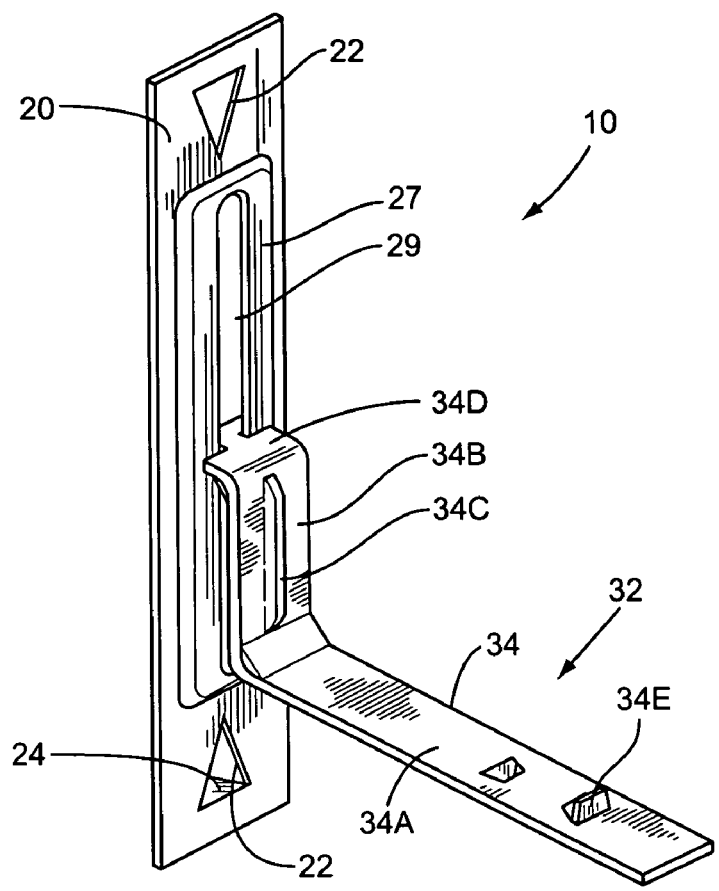
Figure 10:
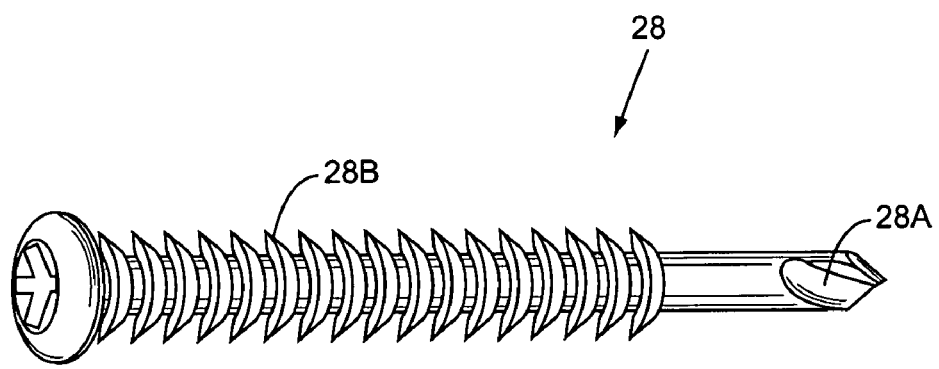
FIG. 10 illustrates a fastener for securing the brick tie to a support structure.

Formed in the plate 20 are a series of fastener openings 26. The fastener openings 26 are strategically placed about the plate such that the plate can be firmly secured to a stud 18. In the case of the embodiments illustrated in FIGS. 2 and 4, the fastener openings include four openings as shown. A different number of openings could, of course, be provided. To secure the plate 20 to the back-up wall 14, there is provided a series of fasteners. In the case of the embodiments illustrated herein, as indicated in FIG. 6, the fasteners are in the form of screws 28. Screws 28 are adapted to be extended from the front face of the plate 20 through the fastener openings 26, through the wallboard 16 and directly into a side flange 18A of a respective stud. That, of course, means that in securing the plate 20 to the wallboard 16, that the plate is specifically aligned with a flange 18A of a stud lying on the opposite side of the wallboard 16. Various types of fasteners 28 can be utilized. FIG. 9 illustrates one particular screw type fastener that would be effective in securing the plates of the brick ties disclosed herein to the backup board 14 and to the stud structures lying behind the back up wall 14. Fastener 29 shown in FIG. 10 includes a drill type end 28A. Between end 28A and the head of the screw 28, there is provided a series of aggressive threads 28B. A fastener such as illustrated in FIG. 10 will effectively secure the brick ties 10 to the backup wall 14 and the flanges 18A of the studs.

Figure 3:
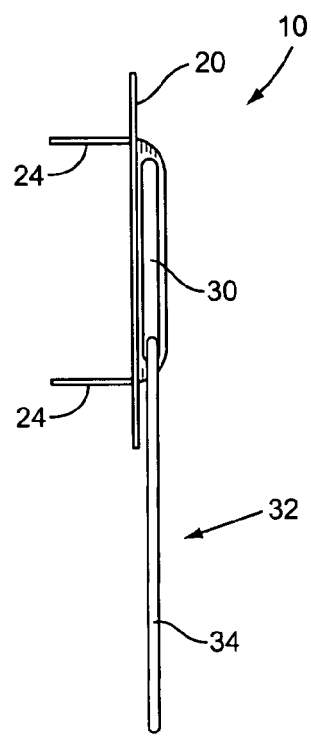
FIG. 3 is a side elevational view of the brick tie.
Figure 5:
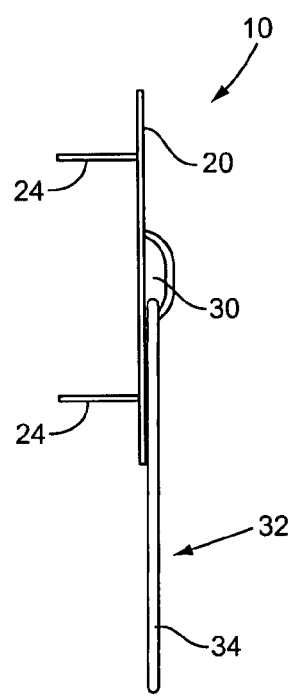
FIG. 5 is a side elevational view of the brick tie shown in FIG. 4.

Formed on the front side of the plate 20 is a tie holder structure. The tie holder includes a slot indicated by the numeral 30. There are two embodiments for the slot 30 disclosed herein. In FIG. 3, for example, the slot 30 is generally elongated and extends about a substantial length of the plate 20. In the embodiment of FIG. 5, the slot 30 is somewhat more rounded and of a height or length less than the slot 30 of the FIG. 3 embodiment.

In any event, a tie indicated generally by the numeral 32 is inserted in or confined within the slot 30. In the case of either embodiment, the tie 32 can be substantially adjusted within the confines of slot 30. That is, the tie 32 can be raised or lowered up and down in the slot 30 such that the tie is disposed at an appropriate level to be inserted between two courses of brick. See for example, FIG. 6.

Figure 2:
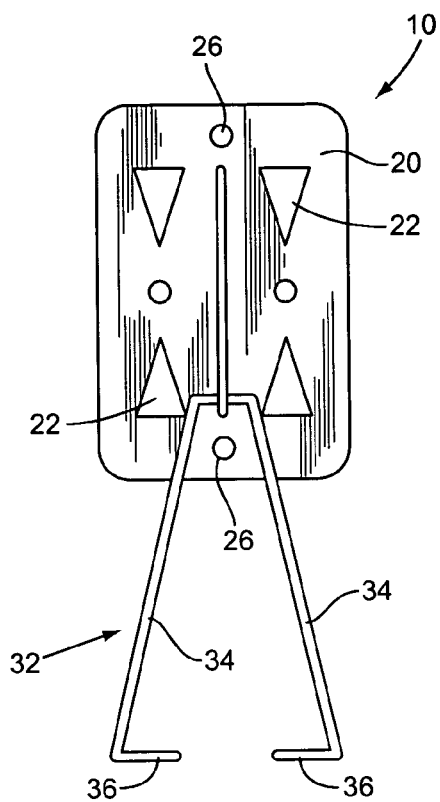
FIG. 2 is a front elevational view of the brick tie.
Figure 4:
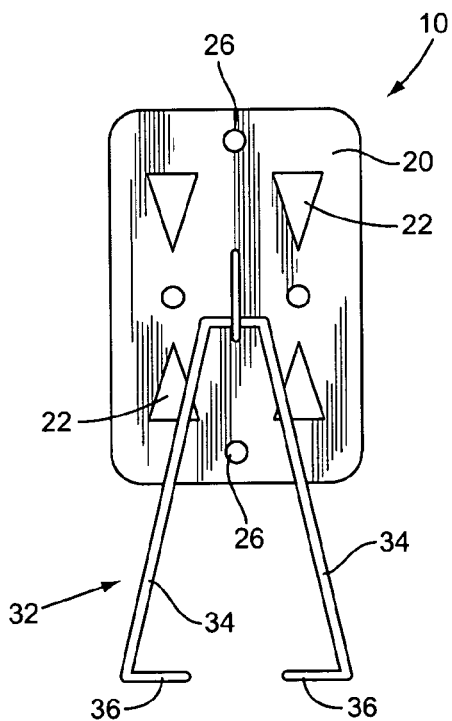
FIG. 4 is a front elevational view of an alternative embodiment for the brick tie.

Each tie 32 assumes a generally V-shape and includes a pair of diverging arms 34. Each arm includes an end portion that is bent or turned inwardly as illustrated in FIGS. 2 and 4. These turned or bent in ends 36 are generally disposed opposite each other and are aligned.

In using the brick tie 10 of the present invention, it is important to appreciate that before the brick tie is secured to the wallboard 16, that the plate 20 should be aligned with a stud 18 disposed on the opposite side of the wallboard. That is, the plate 20 should be properly aligned with the stud 18 such that when the fasteners 28 are extended through the plate 20 that the fasteners will engage and be secured into the flange 18A of the aligned stud. In any event, when the brick tie 10 is properly aligned, a brick mason or other individual can simply press the plate 20 into the wallboard. This, of course, causes the spikes 24 to penetrate the wallboard and secure the plate in a firm position on the wallboard 16. Thereafter, the screws or fasteners 28 are extended through the fastener openings 26, through the wallboard 16 and into the flange 18A of the aligned stud 18. In other words, the screws or fasteners 28 are screwed into the side flange 18A. Now that the plate 20 has been securely anchored to the back-up wall 14, the brick mason can vertically adjust the tie 32 to a proper position with respect to a course of brick or block. It is desirable, as indicated in FIG. 6, for the tie 32 to extend outwardly from the plate 20 at an angle of approximately 90°. This will, of course, vary in some applications. However, the provision of the slot 30 will enable the brick mason to adjust the tie 32 with respect to the course of brick such that the tie can be extended generally normal from the plate 20. Therefore, as shown in FIG. 1, the tie is extended outwardly over a course of brick. Then a second course of brick is placed over the underlying course of bricks such that the tie, along with intervening mortar, is sandwiched between the two courses of brick. As used herein, the term brick, is utilized to mean any type of masonry product including, for example, concrete blocks.

As seen in FIG. 6, the brick tie interconnects the brick wall 12 with the back-up wall 14. By interconnecting the brick tie with both the wallboard and a stud, it is seen that the connection formed is a strong connection that will anchor the brick wall 12.

Figure 7:
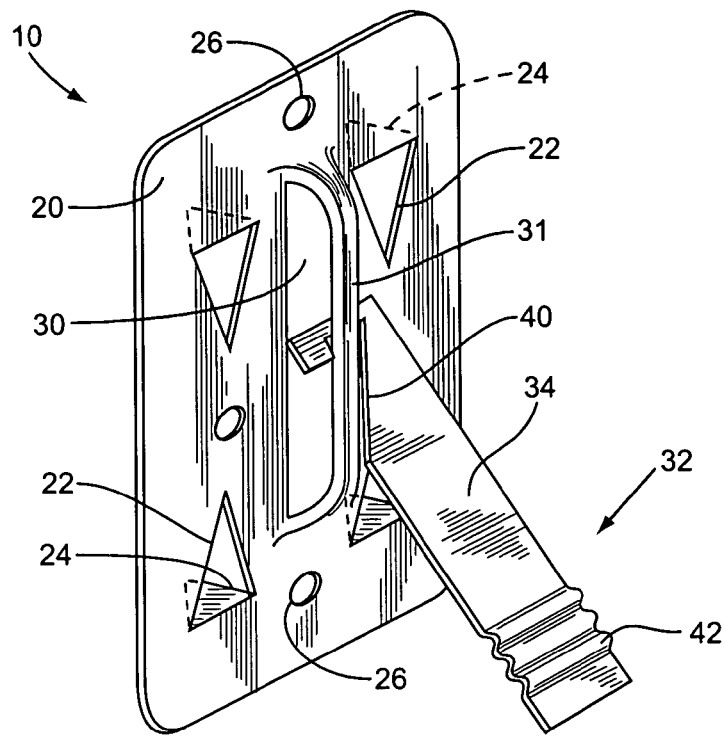
FIG. 7 is a perspective view of an alternate embodiment for the brick tie of the present invention.

Turning to FIG. 7, an alternative embodiment for the brick tie is shown therein and indicated generally by the numeral 10. The FIG. 7 embodiment is generally similar to the embodiments discussed above, but there are some structural distinctions. Viewing the embodiment of FIG. 7, the brick tie includes a plate or back 20. A series of openings 22 are formed in the plate. In the case of this embodiment, the openings 22 are generally triangularly shaped and in the process of forming the openings 22, a spike 24 is formed. The spikes 24 project outwardly from the backside of plate 20.

An opening 30 is formed in the plate 20. Projecting outwardly from the front of the plate 20 is a retainer 31. Note that the retainer 31 extends outwardly in front of the opening 30. As discussed below, retainer 31 functions to hold the tie indicated generally by the numeral 32. The tie 32 includes an arm 34. About the inner end of the arm 34 there is formed an angled slot 40. In the case of the embodiment shown in FIG. 4 the angled slot 40 assumes a generally Z-shaped configuration. Note in FIG. 7 where the angled slot 40 includes a portion that extends partially around the retainer 31. In any event, it is clear that the tie 32 can move up and down on retainer 31 while the slot 40 generally confines or connects the arm 34 to the retainer 31. Disposed on the outer end portion of arm 34 is a series of ridges or ribs 42. The presence of ridges 42 assist in securing the tie 32 within the mortar between overlying bricks.

Again with the embodiment of FIG. 7, the tie 32 can be easily connected and disconnected to the retainer 31 and can be adjusted at various heights with respect to the brick tie 10.

Figure 8:
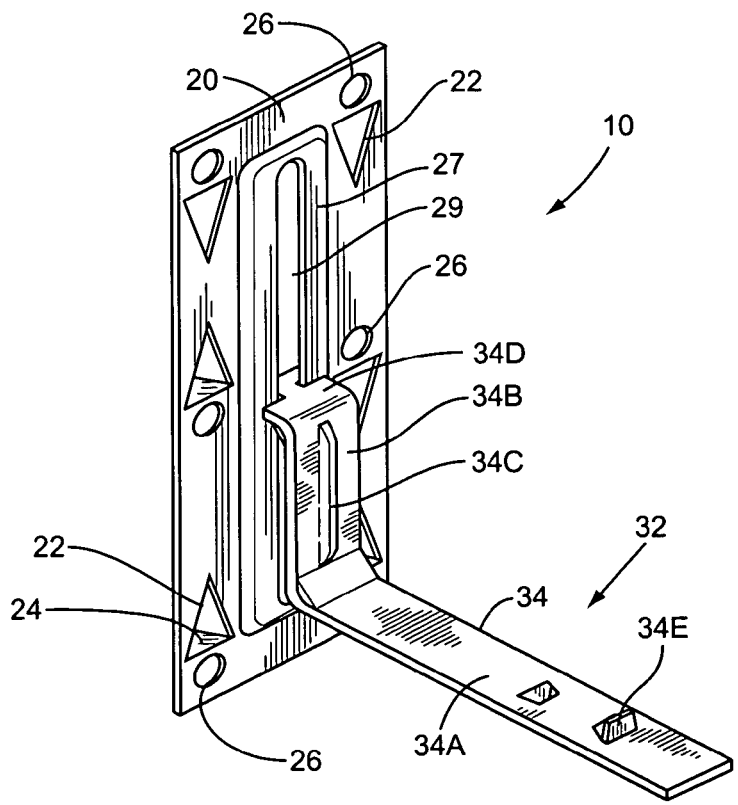
FIGS. 8 and 9 show another alternate embodiment for the brick tie of the present invention.

Turning to FIGS. 8 and 9, yet another embodiment for the brick tie of the present invention is shown therein. There is a slight difference between the designs of FIGS. 8 and 9, but for the most part the two designs are similar. Viewing FIG.

8 first, there is shown therein a brick tie indicated generally by the numeral 10. Brick tie 10 includes a plate 20. Plate 20 includes a series of openings 22. In the process of forming openings 22, a series of spikes 24 are formed. Spikes 24 project rearwardly from the back side of the plate 20 into a back wall indicated generally by the numeral 14 in FIG. 1. In addition, plate 20 includes a series of other openings indicated by the numeral 26. These openings are adapted to receive a fastener, of the type shown in FIG. 10 and indicated generally by the numeral 28. In this particular embodiment, fastener 28 includes a penetrating end 28A and a series of relatively large threads 28B. That is, a fastener 28 is projected through respective openings 26 into the backup wall 14.

Plate 20 includes a raised central portion 27. That is, as viewed in FIG. 8, it is seen that a central portion of the plate 20 is indented or raised outwardly. Formed in the raised central portion 27 is an elongated slot 29. As seen in FIG. 8, the elongated slot 29 includes a surrounding edge.

A tie, indicated generally by the numeral 32, is confined within the slot 29. As will be appreciated from subsequent portions of the disclosure, the tie 32 is movable up and down, as viewed in FIG. 8, within the slot 29. Moreover, the tie can be easily inserted into the slot 29 or removed therefrom.

Tie 32 includes an arm 34. Arm 34 assumes a generally L-shaped configuration. Basically arm 34 includes two main sections, a first section 34A and a second section 34B. A reinforcing rib 34C is formed in the second section 34B. A portion of the arm 34 extends into and is confined within the slot 29. In particular, the arm 34 includes an end portion 34D that projects into slot 29. Formed in the end portion 34D is a pair of opposed notches. The notches, as illustrated in FIGS. 8 and 9, are sized to accept a portion of the surrounding edge of the slot 29. Therefore, when the arm 34 is orated as shown in FIG. 8, the notches confine the arm 34 within the slot 29. Note that the arm 34 can move up and down in the slot 29. To remove the arm 34 from the slot 29, the arm 34 can be rotated 90° such that the end portion 34D aligns with the slot 29, permitting the end portion 34D to be removed from the slot.

Formed along the arm 34 is a series of protrusions or cleats 34E. This imparts some aggressiveness to the arm 34 and contributes to the securement of the tie 32 within a layer of mortar disposed between two courses of brick.

The embodiment of FIG. 9 is substantially similar to FIG. 8 except that the brick tie of FIG. 9 is more narrow. In the case of the embodiment of FIG. 9, the triangular shaped openings 22 would still produce a spike that would extend from the back of the plate 20 into a back up wall 14. However, to provide additional securement, a fastener 28 can be inserted and projected through the openings 22 into the backup wall 14. In any event, the brick tie 10 shown in FIG. 9 is utilized in the same manner as described above. That is, the arm 34 projects from the slot 29 into a layer of mortar, thereby securing an adjacent brick wall at the spaced apart points.

From the foregoing specification and discussion, it is seen that the brick tie 10 of the present invention is generally simple in design and can be easily and economically manufactured. Also, the brick tie 10 is designed such that it can be totally installed by a single tradesman, namely a brick mason.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A brick tie for being interconnected between a brick wall and a backup wall, comprising:
  a. a plate adapted to be secured to the backup wall;
  b. at least one fastener for securing the plate to the backup wall;
  c. an elongated slot formed in the plate;
  d. a generally L-shaped tie adapted to be confined in the slot and movable back and forth therein, and wherein when the tie is confined within the elongated slot, the tie extends outwardly from the plate;
  e. a series of triangular shaped spikes cut from the plate and bent outwardly from the plate such that each triangular shaped spike forms a triangular shaped opening in the plate and projects outwardly from the plate adjacent the triangular shaped opening formed in the plate by the spike;
  f. wherein a portion of the plate is raised and wherein the slot is formed in the raised portion of the plate, the slot including a surrounding edge;
  g. wherein the tie includes an inner end portion that includes a pair of opposed notches and wherein the tie is confined within the slot by inserting the inner end portion of the tie into the slot such that a portion of the surrounding edge of the slot extends into the notches, and wherein the inner end portion of the tie can be moved back and forth within the slot, and wherein the notches are configured such that by rotating the inner end portion of the tie, the tie can be removed from the slot; and
  h. wherein the tie includes an intermediate portion that is turned with respect to the inner portion and where the tie includes an outer portion that is turned with respect to the intermediate portion.

* * * * *